US010417053B2

(12) United States Patent
Akkiraju et al.

(10) Patent No.: US 10,417,053 B2
(45) Date of Patent: Sep. 17, 2019

(54) ADAPTIVE COGNITIVE AGENT

(71) Applicant: International Business Machines Corporation, Armonk, NY (US)

(72) Inventors: Rama K. Akkiraju, Cupertino, CA (US); Raman Harishankar, Blacklick, OH (US); Vibha S. Sinha, Santa Clara, CA (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/406,753

(22) Filed: Jan. 15, 2017

(65) Prior Publication Data

US 2018/0203732 A1    Jul. 19, 2018

(51) Int. Cl.
  *G06F 9/46*   (2006.01)
  *G06F 9/50*   (2006.01)
(52) U.S. Cl.
  CPC .................................. *G06F 9/505* (2013.01)
(58) Field of Classification Search
  CPC .................................................. G06F 9/5005
  See application file for complete search history.

(56) References Cited

U.S. PATENT DOCUMENTS

| 756,200 | A | 4/1904 | Balley |
| 971,254 | A | 9/1910 | Clark |
| 7,562,009 | B1* | 7/2009 | Emerson .................. G06F 17/27 704/9 |
| 8,112,369 | B2 | 2/2012 | Abrsmson |
| 9,442,770 | B1* | 9/2016 | Cudak .................... G06F 9/4881 |
| 9,712,546 | B2 | 7/2017 | Smith et al. |
| 2004/0162811 | A1* | 8/2004 | Wetzer .................... G06Q 10/06 |
| 2008/0140595 | A1 | 6/2008 | Park et al. |
| 2014/0280757 | A1* | 9/2014 | Tran ........................ H04L 67/02 709/219 |
| 2015/0356430 | A1 | 12/2015 | Saxena et al. |
| 2017/0318042 | A1* | 11/2017 | Smith .................. H04L 63/1416 |

* cited by examiner

*Primary Examiner* — Camquy Truong
(74) *Attorney, Agent, or Firm* — Cantor Colburn LLP

(57) ABSTRACT

An approach is provided that uses an availability of a computer resource to tailor an assistance with a task. An adaptive cognitive agent obtains a task assignment. The adaptive cognitive agent obtains an availability of a computer resource available to the adaptive cognitive agent. The availability of the computer resource is used to tailor an assistance with the task, resulting in an assistance plan being stored in a memory.

17 Claims, 4 Drawing Sheets

ADAPTIVE COGNITIVE AGENT

BACKGROUND

Sometimes people use cognitive agents to help them get their questions answered. The cognitive agents use natural language processing to interact with users.

SUMMARY

An approach is described for using an availability of a computer resource to tailor an assistance with a task. An adaptive cognitive agent obtains a task assignment. An availability of a computer resource available to the adaptive cognitive agent is obtained. The availability of the computer resource is used to tailor assistance with the task, resulting in an assistance plan stored in a memory.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
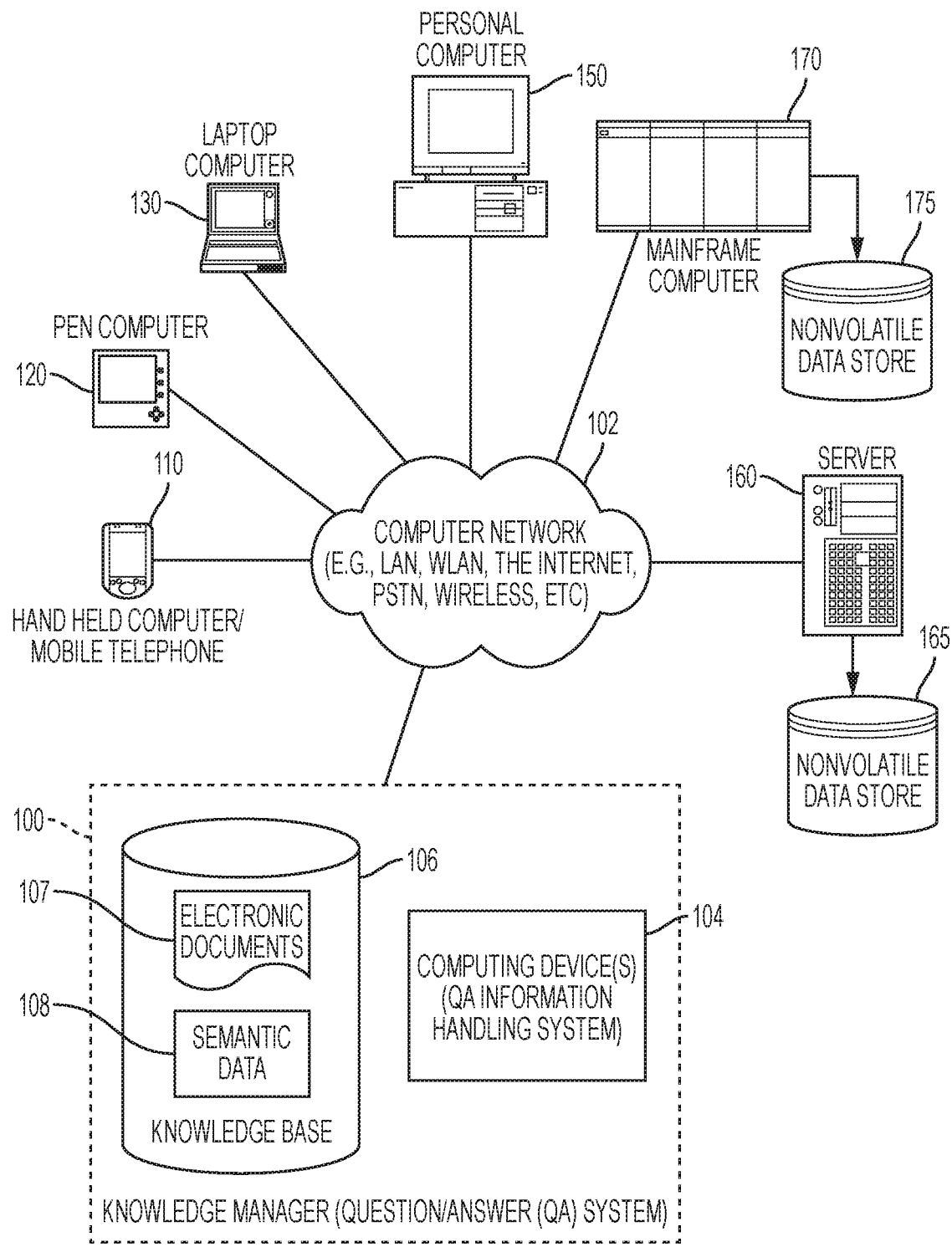
FIG. 1 depicts a schematic diagram of one illustrative embodiment of a question answering (QA) system in a computer network.

FIGS. 1-4 depict an approach for tailoring an assistance with a task. An adaptive cognitive agent may obtain a task assignment. An availability of a computer resource available to the adaptive cognitive agent may be obtained. The availability of the computer resource may be used to tailor assistance with the task.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
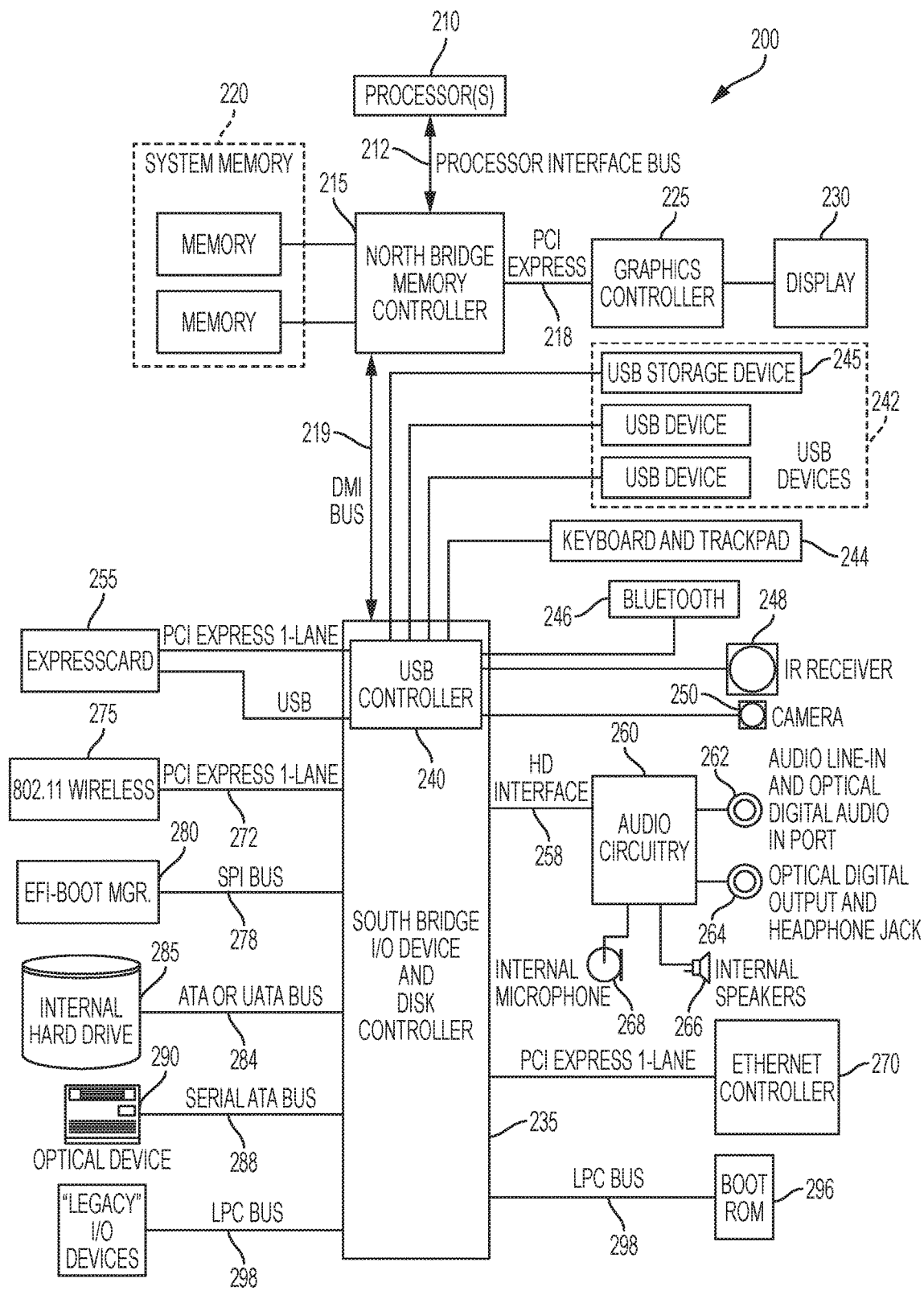
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
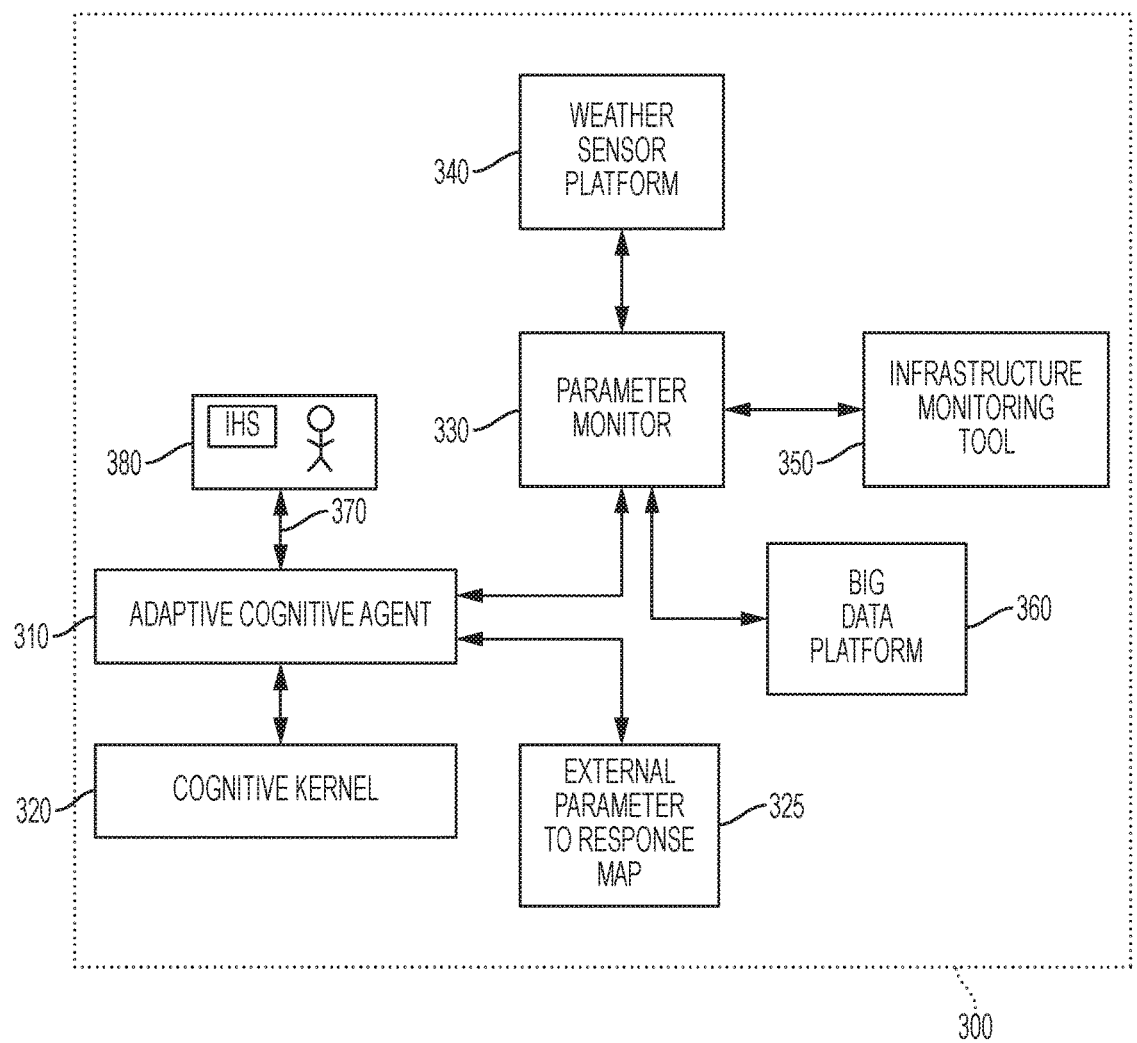
FIG. 3 is an exemplary diagram depicting an architecture used by an adaptive cognitive agent.

FIG. 3 is an exemplary diagram depicting an architecture 300 that may include an adaptive cognitive agent. The architecture 300 may include an adaptive cognitive agent 310, a cognitive kernel 320, an external parameter to response map 325, a parameter monitor 330, a weather sensor platform 340, an infrastructure monitoring tool 350, a big data platform 360, and an ability 370 to interact with a user 380.

The adaptive cognitive agent 310 may be QA system 100. The adaptive cognitive agent 310 may assist a user with tasks that may be repetitive, tedious, or computationally intense. The adaptive cognitive agent 310 may use natural language processing and may be able to carry on a conversation with a user 380. The adaptive cognitive agent 310 may use instant messaging to communicate with the user 380. The adaptive cognitive agent 310 may work as a digital user companion and may provide tips or companionship at leisure time. For example, the adaptive cognitive agent 310 may offer entertaining information to a user for entertainment purposes during hours that are outside of the user's typical business hours.

The adaptive cognitive agent 310 may be operatively coupled to the parameter monitor 330 in a manner to receive a variety of parameter information. For example, the parameter monitor 330 may monitor weather information using the weather sensor platform 340. The parameter monitor 330 may monitor information about a user using a big data platform 360. The parameter monitor 300 may monitor resource availability using the infrastructure monitoring tool 350. The infrastructure monitoring tool 350 may monitor network bandwidth limitations, processing constraints, memory utilization constraints, input/output capacity, and server computation capacity.

The adaptive cognitive agent 310 may obtain parameter information from the user 380. For example, the adaptive cognitive agent 310 may obtain user preferences or constraints from the user, such as, for example, what the user's business hours are.

The adaptive cognitive agent 310 may be working in a constrained environment, and the parameter information may describe the constraints of the environment. The adaptive cognitive agent 310 may utilize a hosted cloud model to interact with the user 380. The adaptive cognitive agent 310 may obtain the parameter information and provide the parameter information to the external parameter to response map 325.

Figure 4:
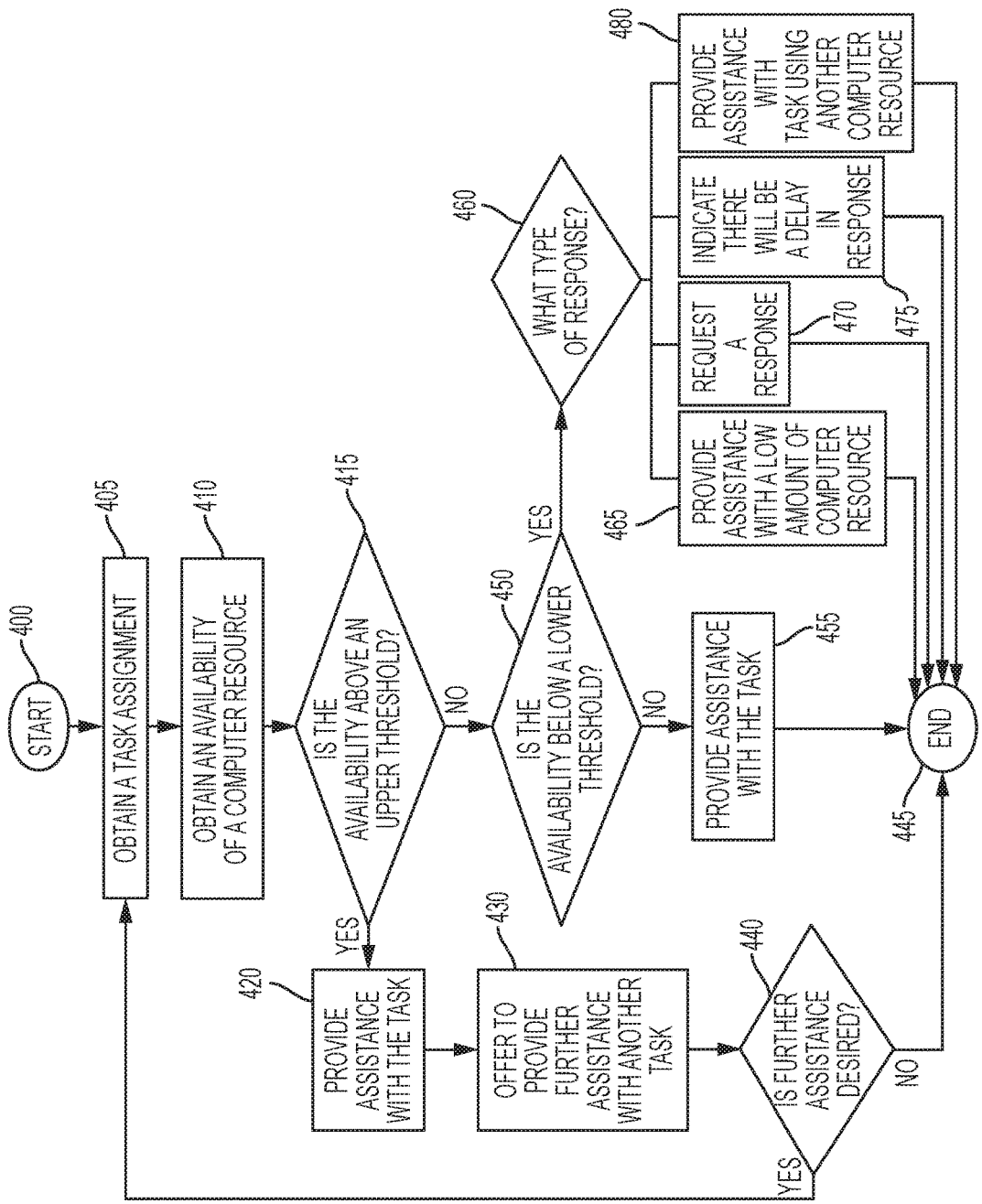
FIG. 4 is an exemplary flowchart that illustrates a process for adapting a cognitive agent in a constrained environment.

FIG. 4 is an exemplary flowchart that illustrates a process for adapting a cognitive agent in a constrained environment. The process commences at 400 and shows steps that may be taken to adapt a cognitive agent. At step 405, the adaptive cognitive agent 310 may obtain a task assignment. The task may include a request from the user 380 for information. The task may include a request from the user 380 for entertainment during leisure time.

At step 410 the adaptive cognitive agent 310 may obtain an availability of a computer resource such as, for example, network bandwidth limitations, processing constraints, memory utilization constraints, input/output capacity, and server computation capacity. The adaptive cognitive agent 310 may obtain the availability of the computer resource from the parameter monitor 330. The adaptive cognitive agent 310 may obtain the availability of the computer resource from the external parameter response map 325.

At step 415, the adaptive cognitive agent 310 may determine whether the availability of the computer resource is above an upper threshold. The upper threshold may include an availability level at which the availability of the computer resource is high enough that the adaptive cognitive agent 310 may use the computer resource for more than the current task. If it is determined that the availability of the computer resource is above the upper threshold, then the process proceeds to step 420.

At step 420, the adaptive cognitive agent 310 may provide assistance with the task. The assistance may include the adaptive cognitive agent 310 providing information that the user 380 requested. At step 430 the adaptive cognitive agent 310 may offer to provide further assistance to the user 380. For example, the adaptive cognitive agent 310 may ask "Did you also want me to provide answers from other Telco industries?" or "Did you also want me to give you references to image libraries for your answer?" At step 440, the adaptive cognitive agent 310 may determine whether the user 380 desires further assistance. For example, the adaptive cognitive agent 310 may obtain a response to the question asked at step 380. If the user 380 does desire further assistance, then the process may continue back to step 405. If the user 380 does not desire further assistance, then the process may end at 445.

If at step 415 it is determined that the availability of the computer resource is not above an upper threshold, then the process may continue to step 450. At step 450, the adaptive cognitive agent 310 may determine whether the availability of the computer resource is below a lower threshold. If the adaptive cognitive agent 310 determines that the availability of the computer resource is not below the lower threshold, the process may continue to step 455. At step 455, the adaptive cognitive agent 310 may provide assistance with the task. The assistance may include the adaptive cognitive agent 310 providing information that the user 380 requested. The process may thereafter end at 445.

If at step 450, the adaptive cognitive agent 310 determined that the availability of the computer resource is below the lower threshold, the process may continue to step 460. At step 460, the adaptive cognitive agent 310 may determine what type of response to use to provide to assist with the task. Options that may be included in the type of response to use include i) using a lower amount of use of the computer resource 465, ii) requesting a response from the user 470, iii) indicating to the user 380 that there may be a delay in response 475, iv) using another computer resource to provide assistance with the task 480.

If at step 450 the adaptive cognitive agent 310 determined that input/output connection availability is below a lower threshold, the adaptive cognitive agent 310 at step 465 may use a low amount of the computer resource. For example, if the adaptive cognitive agent 310 determined that the availability of the input RAM capacity is below a lower threshold, the adaptive cognitive agent 310 may intentionally digress conversations to thin responses and other conversations may be picked based on external parameters.

If at step 450 the adaptive cognitive agent 310 determined that input/output connection availability is below a lower threshold, the cognitive adaptive agent may request a response at step 470. For example, the adaptive cognitive agent 310 may ask "Do you have a minute? I want to ask you something."

If at step 450 the adaptive cognitive agent 310 determined that CPU connection availability is below a lower threshold, the cognitive adaptive agent 310 may use a prompt at step 470 to defer questions that require computation For example, if at step 450 the adaptive cognitive agent 310 determined that input/output connection availability is below a lower threshold, the cognitive adaptive agent 310 at step 475 may indicate that there may be a delay in response such as, for example, "I am going to take some time to respond, please bear with me."

For example, if at step 450 the adaptive cognitive agent 310 determined that CPU availability is below a lower threshold, the cognitive adaptive agent 310 may provide assistance with the task using another computer resource at step 480. For example, the adaptive cognitive agent 310 may use a memory-intensive algorithm instead of a CPU-intensive algorithm.

If at step 450, the adaptive cognitive agent 310 determined that there is a network latency, the adaptive cognitive agent 310 may align conversations that use local components that may be confined within an inner boundary. The process may continue at step 455 where the adaptive cognitive agent 310 may provide assistance with the task using the type of response selected at step 460. The process may thereafter end at 445.

The process 400 may provide a multi-pronged approach to addressing computer resource availabilities and limitations. The adaptive cognitive agent 310 may decide to use a combination of response types at 460. The availability of computer resource available may include an availability of a plurality of computer resources and types of computer resources. The adaptive cognitive agent 310 may determine which computer resources have a higher level of ability for assisting with the task, and may tailor an assistance with the task using the computer resources with a higher level of availability, and may result in an assistance plan being stored in a memory. When determining an availability of a computer resource (and also when determining whether the computer resource is above or below a threshold) the adaptive cognitive agent 310 may use a variety of methods such as, for example, it may use a polling method and/or an event-based collection method.

Embodiments of the approach may be used to improve an information handling system by using an availability of a computer resource to tailor an assistance with a task, and may result in an assistance plan being stored in a memory. Embodiments of the approach may be used to tailor an adaptive cognitive agent's assistance with a task. The adaptive cognitive agent may identify network limitations, computing limitations, and/or other limitations and may use that information to adaptively tailor an assistance with a task. A user may access cognitive capabilities from a local model of cloud offerings where there are computing power restrictions and other restrictions. The adaptive cognitive agent can adapt a length, richness, and scope of conversation (in other words, it can tailor an assistance with a task) based on various constraints.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   obtaining, by an adaptive cognitive agent, a task assignment to assist a user with a task, wherein the adaptive cognitive agent uses natural language processing and is operatively coupled to a parameter monitor;
   obtaining, via the parameter monitor, an availability of a computer resource available to the adaptive cognitive agent;
   obtaining a lower threshold for the computer resource;
   comparing the availability of the computer resource to the lower threshold, resulting in a comparison; and
   using the comparison to tailor an assistance plan for providing assistance with the task, resulting in the assistance plan stored in a memory, wherein the tailoring the assistance plan comprises determining whether the availability of the computer resource is below the lower threshold, and if it is determined that the availability of the computer resource is below the lower threshold, indicating that there will be a delay in the response.

2. The method of claim 1, further comprising obtaining an upper threshold, and wherein the using the comparison to tailor the assistance plan further comprises:
   determining whether the availability of the computer resource is above the upper threshold; and
   if it is determined that the availability of the computer resource is above the upper threshold, offering to provide further assistance with another task.

3. The method of claim 1, wherein the using the comparison to tailor the assistance plan further comprises:
   if it is determined that the availability of the computer resource is below the lower threshold, providing a response which requires a lower amount of the computer resource.

4. The method of claim 1, wherein the using the comparison to tailor the assistance plan further comprises:
   determining whether the availability of the computer resource is predicted to be above the lower threshold in a predetermined amount of time; and
   if it is determined that the availability of the computer resource is below the lower threshold and is predicted to be above the lower threshold in the predetermined amount of time, requesting a response.

5. The method of claim 1, wherein the using the comparison to tailor the assistance plan further comprises:
   determining whether an availability of another type of computer resource available is above another lower threshold; and
   if it is determined that the availability of the computer resource is below the lower threshold and the availability of another type of computer resource available is above the another lower threshold, using the another type of computer resource to assist with the task.

6. The method of claim 1, further comprising:
   obtaining additional information; and
   using the additional information to further tailor the assistance plan.

7. A computer program product stored in a computer readable storage medium, comprising computer program code that, when executed by an information handling system, causes the information handling system to perform the actions comprising:
   obtaining, by an adaptive cognitive agent, a task assignment to assist a user with a task, wherein the adaptive cognitive agent uses natural language processing and is operatively coupled to a parameter monitor:
   obtaining, via the parameter monitor, an availability of a computer resource available to the adaptive cognitive agent;
   obtaining a lower threshold for the computer resource:
   comparing the availability of the computer resource to the lower threshold, resulting in a comparison; and
   using the comparison to tailor an assistance plan for providing assistance with the task, wherein the tailoring the assistance plan comprises determining whether the availability of the computer resource is below the lower threshold, and if it is determined that the availability of the computer resource is below the lower threshold, indicating that there will be a delay in the response.

8. The computer program product of claim 7, further comprising an upper threshold, and wherein the using the comparison to tailor the assistance plan further comprises:
   determining whether the availability of the computer resource is above the upper threshold; and
   if it is determined that the availability of the computer resource is above the upper threshold, offering to provide further assistance with another task.

9. The computer program product of claim 7, wherein the using the comparison to tailor the assistance plan further comprises:
   if it is determined that the availability of the computer resource is below the lower threshold, providing a response which requires a lower amount of the computer resource.

10. The computer program product of claim 7, wherein the using the comparison to tailor the assistance plan further comprises:
    determining whether the availability of computer resource is predicted to be above the lower threshold in a predetermined amount of time; and
    if it is determined that the availability of the computer resource is below the lower threshold and is predicted to be above the lower threshold in the predetermined amount of time, requesting a response.

11. The computer program product of claim 7, wherein the using the comparison to tailor the assistance plan further comprises:
    determining whether the availability of the computer resource available is below the lower threshold;
    determining whether an availability of another type of computer resource available is above another lower threshold; and
    if it is determined that the availability of the computer resource available is below the lower threshold and the availability of another type of computer resource available is above the another lower threshold, using the another type of computer resource to assist with the task.

12. The computer program product of claim 7, further comprising:
    obtaining additional information; and
    using the additional information to further tailor the assistance plan.

13. An information handling system comprising:
    one or more processors;
    one or more data stores accessible by at least one of the processors;
    a memory coupled to at least one of the processors; and
    a set of computer program instructions stored in the memory and executed by at least one of the processors to perform the actions of:
      obtaining, by an adaptive cognitive agent, a task assignment to assist a user with a task, wherein the adaptive cognitive agent uses natural language processing and is operatively coupled to a parameter monitor:
      obtaining, via the parameter monitor, an availability of a computer resource available to the adaptive cognitive agent;
      obtaining a lower threshold for the computer resource;
      comparing the availability of the computer resource to lower the threshold, resulting in a comparison; and
      using the comparison to tailor an assistance plan for providing assistance with the task;
      wherein the tailoring the assistance plan comprises determining whether the availability of the computer resource is below the lower threshold, and if it is determined that the availability of the computer resource is below the lower threshold, indicating that there will be a delay in the response.

14. The information handling system of claim 13, further comprising obtaining an upper threshold, and wherein the using the availability of the computer resource to tailor the assistance plan further comprises:

determining whether the availability of the computer resource is above the upper threshold; and if it is determined that the availability of the computer resource is above the upper threshold, offering to provide further assistance with another task.

15. The information handling system of claim 13, wherein the threshold comprises a lower threshold, and wherein the using the comparison to tailor the assistance plan further comprises:

if it is determined that the availability of the computer resource is below the lower threshold, providing a response which requires a lower amount of the computer resource.

16. The information handling system of claim 13, wherein the threshold comprises a lower threshold, and wherein the using the comparison to tailor the assistance plan further comprises:

determining whether the availability of the computer resource is predicted to be above the lower threshold in a predetermined amount of time; and if it is determined that the availability of the computer resource is below the lower threshold and is predicted to be above the lower threshold in the predetermined amount of time, requesting a response.

17. The information handling system of claim 13, wherein the using the comparison to tailor the assistance plan further comprises:

determining whether an availability of another type of computer resource available is above another lower threshold; and if it is determined that the availability of the computer resource is below the lower threshold and the availability of another type of computer resource is above the another lower threshold, using the another type of computer resource to assist with the task.

* * * * *